C. B. CARSON.
LANTERN.
APPLICATION FILED MAR. 25, 1912.
1,031,421.
Patented July 2, 1912.
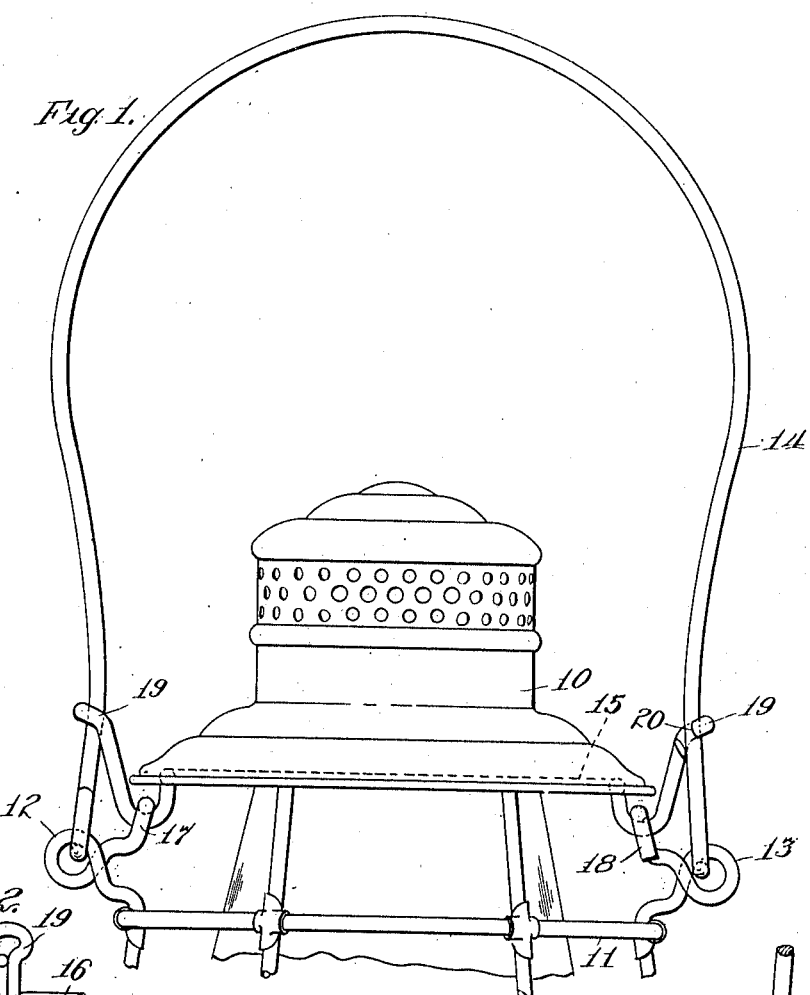
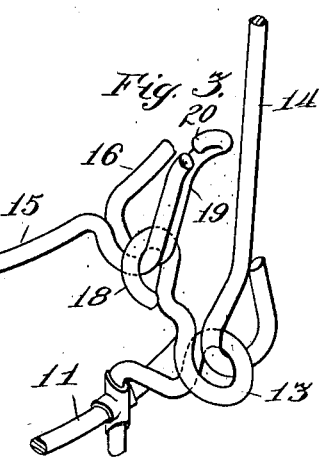
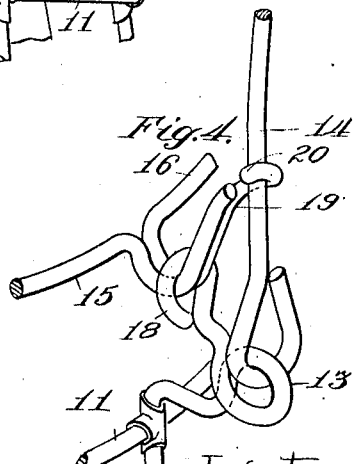
Witnesses
Milton Lenoir
E. M. Klatcher
Inventor
Charles B. Carson.
By Gillson & Gillson
Attorneys.

UNITED STATES PATENT OFFICE.

CHARLES B. CARSON, OF CHICAGO, ILLINOIS, ASSIGNOR TO THE ADAMS & WESTLAKE COMPANY, A CORPORATION OF ILLINOIS.

LANTERN.

1,031,421. Specification of Letters Patent. Patented July 2, 1912.

Application filed March 25, 1912. Serial No. 686,034.

*To all whom it may concern:*

Be it known that I, CHARLES B. CARSON, a citizen of the United States, and resident of Chicago, county of Cook, and State of Illinois, have invented certain new and useful Improvements in Lanterns, of which the following is a specification, and which are illustrated in the accompanying drawings, forming a part thereof.

The invention relates to lanterns such as are used by trainmen and switchmen connected with railroads, and has for its object the provision of improved means for locking a swinging bail to render the lantern more convenient of use in signaling.

An exemplification of the invention is hereinafter described, and is shown in the accompanying drawings, in which—

Figure 1 is a detail side elevation of a lantern embodying the invention; Fig. 2 is a detail in elevation of one of the bail lugs and locking loops; Figs. 3 and 4 are details in perspective, some parts showing in the former the bail as being free to swing and in the latter the bail as being locked against oscillation.

The lantern 10 is provided with a wire guard frame 11. The bail ears 12, 13, are formed by looping outwardly two of the upstanding elements of the frame, the bail 14 having its ends looped to engage the ears and freely swing thereupon. The top ring of the guard frame consists of two sections 15, 16, each extending half way around the lantern, their ends being bent outwardly and passed through loops 17, 18, formed at the upper ends of the guard frame elements which are formed into the bail ears 12, 13. One of these upturned ends 19 is formed into a hook 20 with which the bail 14 may be engaged. The hooks 20 lie within the planes in which the bail normally swings, but project outwardly so that by slight pressure the bail may be sprung into engagement with them.

The bail may be locked against movement by engagment with one of the hooks only. Preferably these hooks are duplicated, one being located at each side of the lantern for the convenience of the user, who may employ either or both of them.

While the invention is illustrated as applied to lanterns having a wire guard frame, it will include in its scope any lantern having an outwardly projecting hook located above the bail ear and adapted to engage and secure the bail.

I claim as my invention—

1. In a lantern, in combination, a guard frame, bail ears attached to the guard frame, a bail swingingly attached to the ears, a hook projecting outwardly from an appurtenance of the lantern and located above one of the ears and being engageable by the bail while attached to the ear.

2. In a lantern, in combination, a wire guard frame comprising upright and circumferential elements, a pair of the uprights being looped to form bail ears and one of the circumferential elements being provided with an outstanding hook above one of the bail ears, a bail swingingly attached to the ears and engageable with the hook.

CHARLES B. CARSON.

Witnesses:
  LOUIS K. GILLSON,
  E. M. KLATCHER.